(12) United States Patent
Randall et al.

(10) Patent No.: US 8,838,893 B1
(45) Date of Patent: Sep. 16, 2014

(54) JOURNALING RAID SYSTEM

(71) Applicants: Andrew Randall, Newbury (GB);
Alastair Bryers, Wallingford (GB);
Thomas F. Gosnell, Hudson (CA)

(72) Inventors: Andrew Randall, Newbury (GB);
Alastair Bryers, Wallingford (GB);
Thomas F. Gosnell, Hudson (CA)

(73) Assignee: Nexsan Corporation, Thousand Oaks, CA (US)

( * ) Notice: Subject to any disclaimer, the term of this patent is extended or adjusted under 35 U.S.C. 154(b) by 0 days.

(21) Appl. No.: 14/041,975

(22) Filed: Sep. 30, 2013

Related U.S. Application Data

(63) Continuation of application No. PCT/US2012/031823, filed on Apr. 2, 2012.

(60) Provisional application No. 61/516,320, filed on Apr. 1, 2011.

(51) Int. Cl.
*G06F 12/02* (2006.01)
*G06F 3/06* (2006.01)

(52) U.S. Cl.
CPC ............ *G06F 3/065* (2013.01); *G06F 3/0604* (2013.01); *G06F 3/0689* (2013.01)
USPC ...................................................... 711/114

(58) Field of Classification Search
CPC ..... G06F 3/065; G06F 3/0604; G06F 3/0656; G06F 3/0659; G06F 3/0689
See application file for complete search history.

(56) References Cited

U.S. PATENT DOCUMENTS

| | | | |
|---|---|---|---|
| 4,507,751 A * | 3/1985 | Gawlick et al. | 707/672 |
| 6,223,251 B1 | 4/2001 | Nemoto | |
| 7,010,721 B2 | 3/2006 | Vincent | |
| 7,929,808 B2 * | 4/2011 | Seaman et al. | 382/305 |
| 8,065,442 B1 * | 11/2011 | Chatterjee et al. | 710/5 |
| 2003/0001889 A1 * | 1/2003 | Darby | 345/752 |
| 2003/0041211 A1 | 2/2003 | Merkey et al. | |
| 2004/0111557 A1 * | 6/2004 | Nakatani et al. | 711/113 |
| 2006/0010472 A1 * | 1/2006 | Godeny | 725/62 |
| 2007/0180000 A1 * | 8/2007 | Mine et al. | 707/672 |
| 2007/0254922 A1 * | 11/2007 | Hiraiwa et al. | 514/338 |
| 2010/0199040 A1 | 8/2010 | Schnapp et al. | |
| 2010/0205479 A1 | 8/2010 | Akutsu et al. | |
| 2011/0035565 A1 | 2/2011 | Barrall | |

OTHER PUBLICATIONS

International Search Report and Written Opinion for Serial No. PCT/US2012/31823.
International Preliminary Report on Patentability(Ch.II) mailed Aug. 26, 2013.

* cited by examiner

*Primary Examiner* — Hiep Nguyen
(74) *Attorney, Agent, or Firm* — Brooks Acordia IP Law, P.C.

(57) ABSTRACT

A method of providing data storage is disclosed that includes writing a plurality of data non-sequentially to at least one first storage drive, the at least one first storage drive having a random first input/output operations per second (IOPS) speed, and writing the plurality of data and an associated plurality of journal metadata sequentially to at least one second storage drive, the at least one second storage drive having a second random IOPS speed that is slower than the first random IOPS speed.

3 Claims, 5 Drawing Sheets

JOURNALING RAID SYSTEM

CROSS REFERENCE TO RELATED APPLICATIONS

This application is a continuation of International Application No. PCT/US2012/031823 filed Apr. 2, 2012, which claims priority to and the benefit of U.S. Provisional Application No. 61/516,320 filed Apr. 1, 2011, both of which are hereby incorporated by reference herein for all purposes.

TECHNICAL FIELD

This invention relates to Redundant Array of Independent Disks systems, and more particularly to Redundant Array of Independent Disk systems using solid-state drives.

BACKGROUND

Solid-state drives ("SSD drives") are becoming increasingly popular for deployment in Redundant Array of Independent Disks ("RAID") systems to service transactional applications like databases. Such applications typically consist of input and output requests ("I/O requests") that have small transfer sizes with consecutive I/O requests that are very often not in sequential Logical Block Address (LBA) order (collectively referred to as "random" I/O requests). It is convenient to measure the suitability of a drive for random I/O requests, whether an SSD drive or a spinning magnetic drive, by testing it with a synthetic benchmark tool that issues relatively small I/O commands to random LBA addresses, and measures how many of these can be performed in one second. This provides a measure of the random IOPS speed of the drive. SSD drives typically have a random IOPS speed that is hundreds to thousands of times faster than conventional spinning magnetic drives and so SSD drives are advantageous when random IOPS speed is an issue. Also, unlike conventional spinning magnetic drives, the performance of SSD drives does not degrade significantly if consecutive requests are for any randomly chosen LBA.

Unfortunately, when SSD drives are deployed in traditional RAID-5 and RAID-6 configurations, the random write performance of the RAID set is limited by the need to perform read-modify-write operations. Every random host block write to the RAID array causes the data and parity drives for the RAID stripe to be read, new parity calculated and then the data and parity drives must be over-written. The software complexity typically required to implement the read-modify-write operations in otherwise advantageous RAID-5 and RAID-6 configurations cause random write IOPS to be approximately 25% of random read IOPs even with the benefit of SSD drives, which tend to be more expensive than spinning magnetic drives.

A need continues to exist to reduce software complexity in the IOpath to increase performance while minimizing the cost for storage implementation to add redundancy to the storage pool.

SUMMARY

Embodiments of the invention include a method of providing data storage, comprising writing a plurality of data non-sequentially to at least one first storage drive, the at least one first storage drive having a first random input/output operations per second (IOPS) speed; and writing the plurality of data and an associated plurality of journal metadata sequentially to at least one second storage drive, the at least one second storage drive having a second random IOPS speed that is slower than the first random IOPS speed. The writing the plurality of data and associated journal metadata sequentially may further comprise writing the plurality of data and associated plurality of journal metadata sequentially in an active write journal. In such an embodiment, the method may also comprise writing a second plurality of data and an associate second plurality of journal metadata sequentially to a new write journal; and copying an image copy of the at least one first storage drive onto the at least one second storage drive using a sequential write of the at least one second storage drive. Also, the method may comprise releasing the active write journal; and writing the second plurality of data non-sequentially to the at least one first storage drive. The copying an image copy of the at least one first storage drive onto the at least one second storage drive may further comprise copying an image copy of the at least one first storage drive distributed onto a redundant array of independent drives (RAID). In such embodiments, the RAID may be configured in a RAID-5 configuration. The at least one first storage drive may be a solid state drive (SSD) and the at least one second storage drive may be at least one spinning magnetic drive. The at least one first storage drive may be a first solid state drive (SSD) and the at least one second storage drive may be a second SSD. Some embodiments include coalescing write data blocks into write journal-buffers; and performing the writing of the plurality of data and the associated plurality of journal metadata sequentially to the at least one second storage drive after the write data blocks are coalesced.

Embodiments of the invention also include an apparatus for providing data storage, comprising at least one first storage drive having a random first input/output operations per second (IOPS) speed; at least one second storage drive having a second input/output operations per second (IOPS) speed, the at least one second storage drive having a second random IOPS speed that is slower than the first random IOPS speed; and a controller configured to write a plurality of data non-sequentially to the at least one first storage drive and configured to write the plurality of data and the associated plurality of journal metadata sequentially to the at least one second storage drive. The at least one first storage drive may be a solid state drive (SSD) and the at least one second storage drive may be at least one spinning magnetic drive. Such embodiments, the at least one first storage drive may be a first solid state drive (SSD) and the at least one second storage drive may be a second SSD.

Further embodiments of the invention include a method of providing data storage comprising writing a first plurality of data non-sequentially to at least one solid-state drive, coalescing the first plurality of data and an associated plurality of journal metadata in a write journal buffer of a controller, and writing the first plurality of data and an associated first plurality of journal metadata in a first write journal of a plurality of spinning magnetic drives using a full stripe write. This embodiment may also include writing a background copy of the at least one solid-state drive across at least one of the plurality of spinning magnetic drives, and may include writing a second plurality of data and an associated second plurality of journal metadata in a second write journal of the plurality of spinning magnetic drives after the writing the background copy is complete.

BRIEF DESCRIPTION OF THE DRAWINGS

The components in the figures are not necessarily to scale, emphasis instead being placed upon illustrating the principals of the invention. Like reference numerals designate corresponding parts throughout the different views.

DETAILED DESCRIPTION

Figure 1:
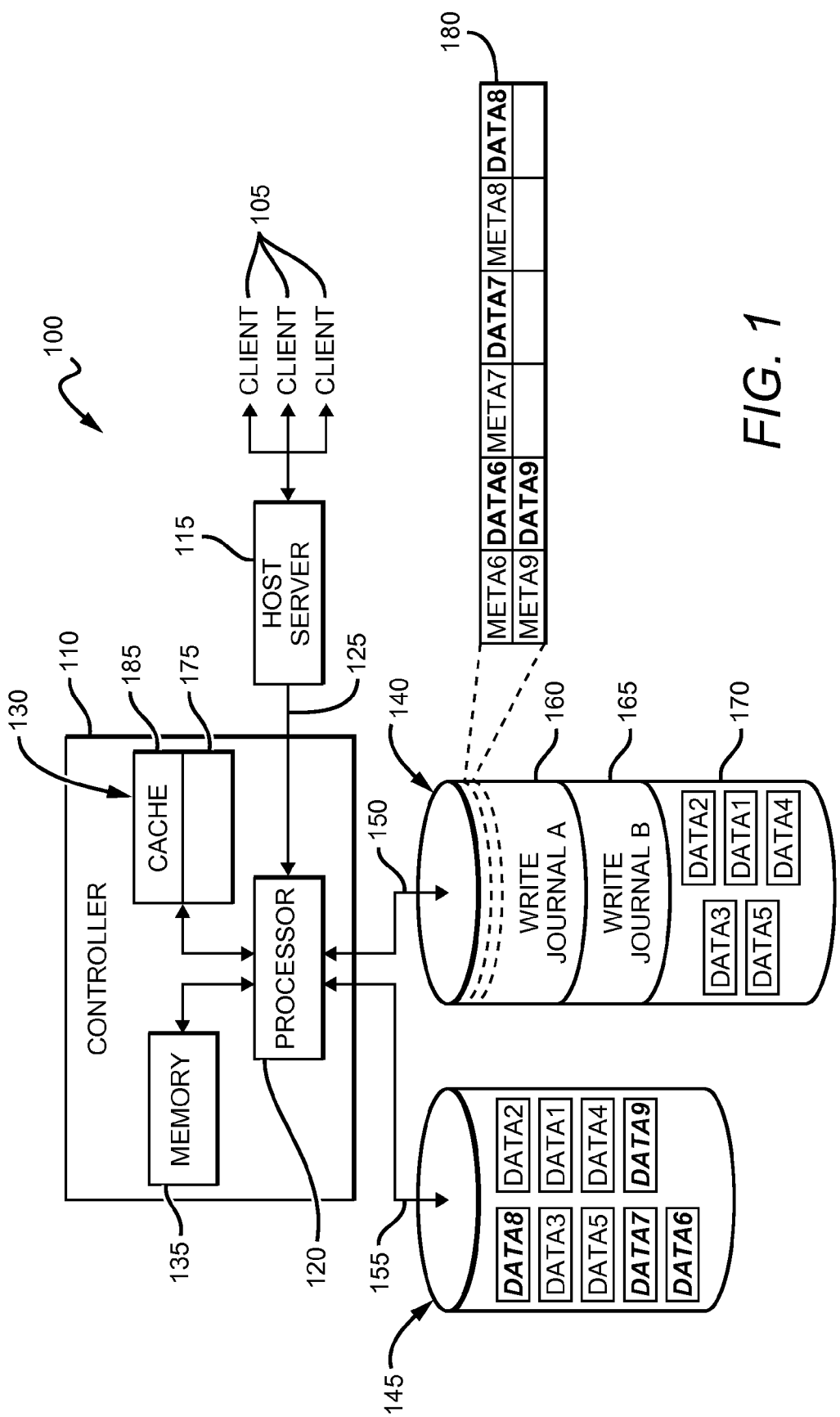
FIG. 1 is a block diagram of one embodiment of a system having a higher-IOP-speed or "fast" drive for performance and a slower-IOP-speed or "slow" drive for data redundancy.

A storage array system is disclosed that has two sets of storage drives to accomplish (1) random write and (2) write-data-store (WDS) and image copy functions, respectively. The WDS and image copy set is defined by input/output random operations per second (IOPS) drive speeds that are less than the random IOPS speeds of the random write drives. This system definition allows the use of lower-cost drives for data redundancy while maintaining high performance for random write functions. In one embodiment, the high-performance random write set of storage drives has at least one random-write solid-state drive (SSD) and the write-data-store and image copy set of storage drives has at least one sequential-write spinning magnetic drive such as a serial advanced technology attachment (SATA) drive or serial-attached SCSI (SAS) drive. In another embodiment, the high-performance random write set of storage drives has fast (i.e. expensive) solid-state drives (SSD) and the write-data-store and image copy set of storage drives set has slower (i.e. less expensive) SSD drives. FIG. 1 illustrates one embodiment of a system 100 for redundant data storage for a host server, with the system having a higher-IOP-speed or "fast" drive for performance and a slower-IOP-speed or "slow" drive for data redundancy. In the figures that follow and their related description, reference to a "slow" drive and a "fast" drive is intended to describe the relative random IOPS speed between them, rather than an absolute IOPS drive speed that qualifies as "fast" or "slow." Service requesters, or clients 105, may be in communication with a storage controller 110 through the host server 115. The storage controller 110 supports the read/write process between the host server 115 and the drives (see below) and may have a processor 120 to process incoming host write data. The processor 120 may be in communication with the host server 115 through a controller bus 125 that may be a Fibre Channel ("FC"), Serial Attached SCSI (Small Computer System Interface) ("SAS"), Internet Small Computer System Interface ("iSCSI"), or Peripheral Component Interconnect Express ("PCIe") buses or any other bus that is appropriate to communicate between the processor 120 and host server 115. The processor 120 may be in communication with a write cache 130 that stores host write data and with a processor memory 135 that stores processor instructions.

In the embodiment illustrated in FIG. 1, the processor 120 may also be in communication with a slow drive, such as a spinning magnetic drive 140, and a fast drive, such as an SSD drive 145, each through the same bus or through respective buses (150, 155) that may be FC, SAS, iSCSI, or PCIe buses or any other bus that is appropriate to communicate between the processor 120 and drives (140, 145). The spinning magnetic drive 140 may be a SAS or SATA drive and may have one or more write journals (160, 165) (two illustrated) that are partitioned from a fast-drive image copy area 170. The write journals (160, 165) and fast-drive copy portion 170 function as a write-data-store (WDS) and image copy of the SSD drive 145, respectively. In a preferred embodiment, the spinning magnetic drive 140 is configured for sequential, rather than random, host data writes.

Turning back to the controller 110, the cache 130 may have a first write journal buffer 175 comprised of a write-data buffer and a journal metadata space (not shown) for receipt of host write data and associated metadata that may be coalesced by the processor 120 into a single linear write stream for a later write to the spinning magnetic drive 140. The metadata may describe the contents and location of the host write data on the SSD drive 145 (see below), with the host write data and metadata defining a write journal block 180. The size of the write journal buffer 175 is preferably selected to be a multiple of a stripe size for the spinning magnetic drive 140 so that each write journal buffer written to the spinning magnetic drive 140 forms a complete stripe to ensure that a full stripe write occurs. The write journal block 180 may thus be sized and written to a write journal 160 of the spinning magnetic drive 140 as a full stripe write, along with a simple write of the host write data to the SSD drive 145. The controller 110 may have at least a second write journal buffer 185 so that the spinning magnetic drive 140 has at least a second associated write journal buffer 185. In an alternative embodiment, the cache 130 may be a memory configured outside of the controller 110, such as an SSD cache drive.

During operation, in order to accomplish the real-time receipt of host write data, the first and second write journal buffers (175, 185) may be maintained in one of three states:

State 1: Idle—the write journal buffer is allocated, and idle. The buffer may contain valid host write data used for read caching.

State 2: Filling—in this state the write journal buffer is accepting data from the host server 115 and journal metadata from the processor 120, host write data is coalesced into a sequential stream in the write journal buffer.

State 3: Draining—the write journal buffer is full of host write data and currently being written to the spinning magnetic drive 140.

More particularly, host write data from the host server 115 may be moved in several stages through the system 100. Initially, the host write data may be cached into a write-data buffer that is in the Filling state (State 2). The host write data is also written to the SSD drive 145. When the current Filling write-data buffer is full, then the state is changed to Draining and the write-data buffer and associated journal metadata space of the write journal buffer 175 is written to the spinning magnetic drive 140. A new write-data buffer is allocated to the Filling state. To accomplish both writes from the cache 130 and from the SSD drive 145 to the spinning magnetic drive 140, bandwidth for the spinning magnetic drive 140 may be divided between two types of operation: (1) updating the write journals (160, 165) and (2) performing a background copy of the SSD drive 145 (an "SSDCopy operation"). Approximately 50% of the total bandwidth of the spinning magnetic drive 140 may be allocated to each activity. The SSDcopy operation compacts the relevant write journal (160, 165) onto the fast-drive copy portion 170. This is performed as a background task, either daily or more frequently. If the SSD drive 145 is fully operational, the write journal compaction is simply a copy of the SSD drive 145 that is written to the fast-drive copy portion 170 of the spinning magnetic drive 140. A write journal base pointer is reset to the time point at which the SSDcopy operation started, thus all writes that were in the write journal 160 before the copy are invalidated.

A dirty journal bitmap (DJB) may also be maintained in a bitmap in the cache 130 to record the write journal blocks 180 that have been written onto both the SSD drive 145 and into the write journal 160 of the spinning magnetic drive 140, but that have not yet been a part of a background copy of the SSD drive 145 into the fast-drive copy portion 170 of the spinning magnetic drive 140. The DJB may allow the processor 120 to determine if host data requests for a failed SSD are to be satisfied from the fast-drive copy portion 170 or from either of the write journals (160, 165) in the spinning magnetic drive 140. When a write to the SSD drive 145 occurs, then the corresponding bits in the DJB are set to indicate that the host write data in the fast-drive copy portion 170 is stale. When an SSDCopy operation moves the correct data from the SSD drive 145 onto the fast-drive copy portion 170, then the corresponding bits in the DJB are cleared to indicate that the fast-drive copy portion 170 is coherent for these blocks. The dynamic nature of the DJB and the fact that spinning drive drives can take several seconds to complete commands may require two or more temporal copies of the DJB to exist at any one time to maintain high performance. The controller 110 software may periodically make the temporal copies of the DJB coherent. The current coherent temporal copy of the DJB may be periodically written onto the spinning magnetic drive in the write journal stream through the bus 150. As an SSDcopy operation proceeds, its bits are cleared from the DJB indicating that the spinning magnetic drive copy of the SSD drive contains the latest data. Writing the DJB reduces the work required to recover from an event like a shutdown, power cycle and restart where the SSD drive fails. The latest temporal copy of the DJB can be reloaded from the write journal 160, then the write journal from that point in time can be scanned to quickly add the additional updated blocks into the DJB. Non-volatile memory on the controller 110 may be used to protect the DJB contents as a result of unexpected power loss.

Figure 2:
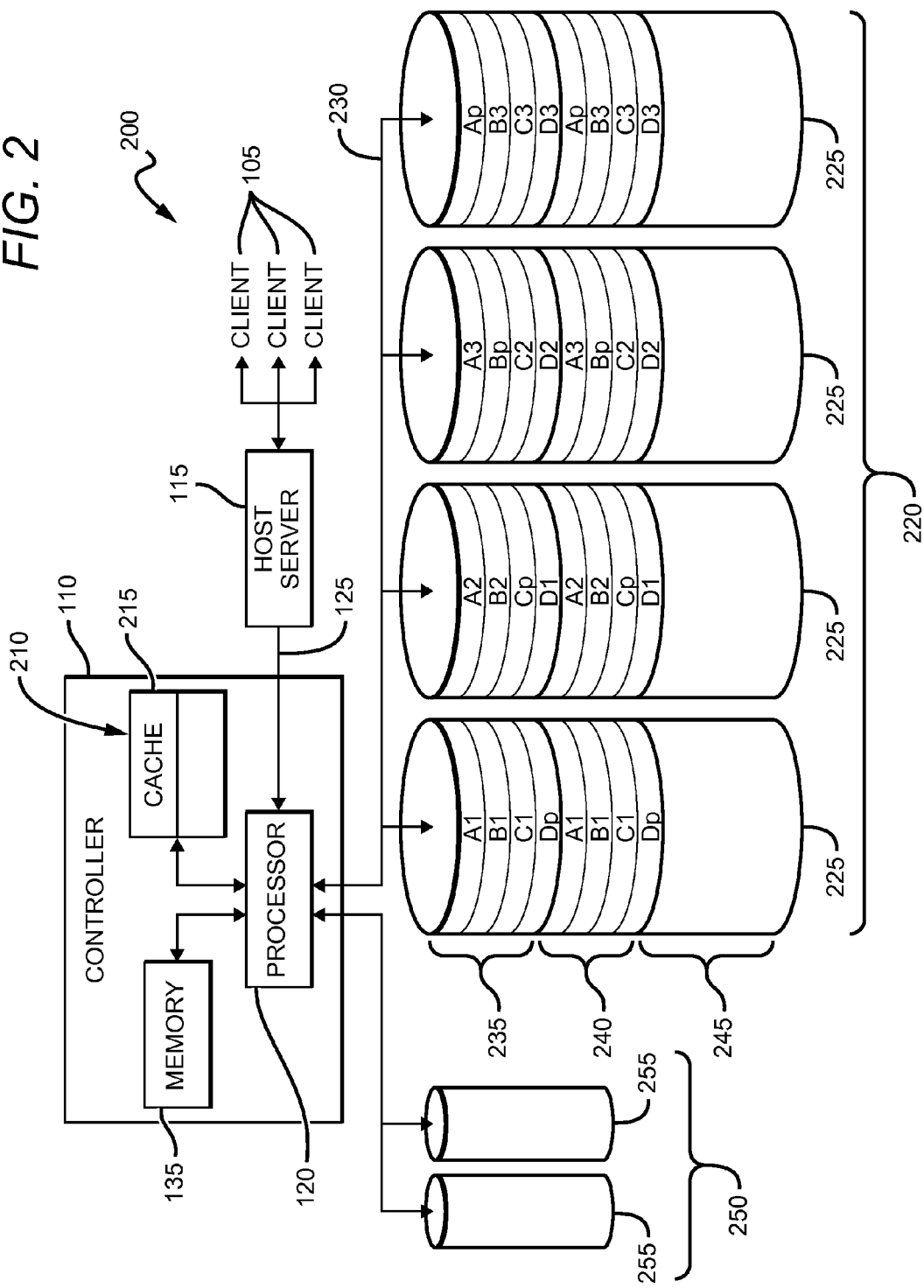
FIG. 2 is a block diagram of another embodiment of a system having a slow drive pool protected with simple parity P data in a RAID-5 configuration for data redundancy and a pair of fast drives for write performance.

FIG. 2 illustrates the controller and host server first illustrated in FIG. 1, each configured in a system for redundant data storage 200 that has the controller in communication with a slow drive pool protected with simple parity P data in a RAID-5 configuration for data redundancy and a pair of fast drives for write performance. The clients 105 may be in communication with the processor 120 in the storage controller 110 through the host server 115 by way of the controller bus 125. The processor 120 may be in communication with a write cache 210 that stores host write data and associated metadata, and may be in communication with a processor memory 135 that stores processor instructions.

The write cache 210 may have one or more write journal buffer areas 215 that include a respective plurality of write-data buffers and a journal metadata spaces (not shown) for receipt of host write data and associated metadata. During operation, host write data from the host server 115 may be cached into one of the plurality of write-data buffers that is in the Filling state (State 2) (supra). When the current Filling write-data buffer is full, then the state of the buffer is changed to Draining (State 3) (supra) and the write-data buffer and associated journal metadata space of the write journal buffer 215 may be written sequentially to a set 220 of slow drives, such as spinning magnetic drives 225, which are in communication with the processor 120 through a bus 230 that may be an FC, SAS, iSCSI, or PCIe bus or any other bus that is appropriate to communicate between the processor 120 and slow drives 225. The spinning magnetic drives 225 may be SAS or SATA drives and may each have at least two write journals (235, 240) partitioned from a fast-drive image copy area 245. The write journals (235, 240) and fast-drive copy portions 245 provide a RAID-5-protected WDS and image copy of a pair 250 of SSD drives 255 that may be in communication with the processor 120 through a bus 260. The bus 260 may also be an FC, SAS, iSCSI, or PCIe bus or any other bus that is appropriate to communicate between the processor 120 and SSD drives 255. With the write journal buffer 215 sized appropriately to provide a complete stripe across the set 220 of slow drives 225, including P-data calculated by the processor 120, each write journal buffer is written sequentially to the RAID-5 set 220 with a full stripe write.

A DJB may also be maintained in a bitmap in the cache 210 to record the write-data buffer blocks (not shown) that have been written onto one of the SSD drives 255 and into the write journal (235, 240) of set 220 of spinning magnetic drives 220, but that have not yet been a part of a background copy of the SSD drives 255 into the fast-drive copy portions 245 of the spinning magnetic drives 225. As described for the embodiment of FIG. 1, when a write to one of the SSD drives 255 occurs, then the corresponding bits in the DJB are set to indicate that the host write data in the fast-drive copy portions 245 are stale. When an SSDCopy operation moves the correct data from the SSD drives 255 onto the fast-drive copy portions 245, then the corresponding bits in the DJB are cleared to indicate that the fast-drive copy portions 245 are coherent for these blocks.

In another embodiment of the system for redundant data storage 200, the controller and host server are in communication with a set of slow drives protected with simple parity P data in either a RAID-3 or RAID-4 configuration.

In one embodiment of the invention that uses a five-drive set of spinning magnetic drives in a RAID-5 configuration, each write journal buffer may be comprised of 4 Mbytes of write-data-buffer including 8 kBytes of journal metadata. The 4 Mbytes is logically broken down into 1022 data slots of 4096 bytes, plus 8 k of Journal metadata. Host write data may be placed sequentially into the write journal buffer and an entry is added to a journal metadata table to describe each data slot. The journal metadata will contain the SSD drive logical block address for the data slot (typically 48 bits), a length of 8-bits to describe up to 256 SSD drive blocks in a single entry, and 8 bits of flags. An example of a write journal buffer is shown in Table 1. In this example the SSD drive has a block size of 512 bytes.

TABLE 1

| Write-Data-Block Offset | DATA in Memory |
|---|---|
| 0x0000.0000 | SSD Data for LBA 0x1234450, Length 4096 bytes |
| 0x0000.1000 | SSD Data for LBA 0xfd4, length 4096 bytes |
| 0x0000.2000 | SSD Data for LBA 0x45346, length 4096 bytes |
| 0x0000.3000 | SSD data for LBA 0x4534E, length 3584 bytes |
| 0x0000.4000 | SSD data for LBA 0xff54fa, length 512 bytes |
| 0x0000.5000 | SSD data for LBA, 0x353456, length 4096 bytes |
| Etc, upto offset 0x003F.d000 | etc |

One example of a Write-Data-Buffer format is provided in Table 2.

TABLE 2

| Offset | LBA | Len | State Flags |
|---|---|---|---|
| 0x003F.E000 | 0x1234450 | 8 | 0 |
| 0x003F.E008 | 0xfd4 | 8 | 0 |
| 0x003F.E010 | 0x45346 | 15 | 0 |
| 0x003F.E018 | 0xff54fa | 1 | 0 |
| 0x003F.E020 | 0x353456 | 8 | 0 |
| Etc, upto 0x003F.FFF8 | | | |

If the write journal buffer describes SSD data for an SSD formatted with 4096 byte blocks, then the length field is still used to represent one 4 k block, instead of one 512 byte block on the SSD. This does not need to be explicitly recorded in the journal. The use of data protection for the write-data-store in the form of parity P or P+Q allows for greater data redundancy within the array. Data is not lost until the SSD and spinning magnetic drives are degraded to the point that the data cannot be reconstructed from the remaining magnetic drives and is not present on the SSD drives. Data loss for a parity protected write-data-store would require the failure of at least two spinning magnetic drives and one SSD. In all implementations many SSD drives can fail as long as the data integrity of the write-data-store can be maintained. The data written to the SSD drives can either be striped across the SSD in a similar manner to a traditional RAID-0 implementation or alternatively, the SSD storage can be arranged in a contiguous linear arrangement. Contiguous arrangement of the SSD data blocks has advantages when the capacity of the SSD portion of the RAID set is expanded by adding new SSD drives because it removes the requirement to reorder the data on the SSD drives to support an increased stripe size which would be required for traditional striped RAID-0 arrangement on the SSD.

In an alternative embodiment of the WDS and fast-drive partition scheme illustrated FIG. 2, the WDS can be partitioned with the fast-drive image copy area as described in Table 3.

TABLE 3

SSDCopy blocks (0 to n − 1)
Write journal area 0
Journal metadata area 0
SSDCopy blocks n to (2n − 1)
Write journal area 1
Journal metadata area 1
SSDCopy blocks (2n to 3n − 1)
Etc, etc, In this embodiment, the host write data in the SSD drive(s) as imaged onto the fast-drive image copy area during the SSD-Copy operation are interspersed with the write journal data across the spinning magnetic drives 225. This layout of the data blocks ensures that seek times for the spinning magnetic drives are minimized. The active write journal data area may be selected dependent on the active segment for the SSDCopy process. For example if the SSDCopy process is currently coping data from the SSD drives to the WDS segment called "SSDCopy blocks (n to 2n−1)", where n equals the number of blocks of each SSDCopy area segment, then all the write journal data will be written to "Write journal area 1". This may greatly reduce the seek time for the spinning drives.

In another embodiment of the WDS and fast-drive partition scheme first illustrated FIG. 2, the WDS can be partitioned with the fast-drive image copy area as described in Table 4.

TABLE 4

SSDCopy blocks (0 to n − 1)
Write journal area for SSD blocks (0 to n − 1)
Journal metadata area 0
SSDCopy blocks (n to 2n − 1)
Write journal area for SSD blocks (n to 2n − 1)
Journal metadata area 1
SSDCopy blocks (2n to 3n − 1)
Etc, etc, In this embodiment, the arrangement of the WDS is also based upon a segmented write journal, however the host write data and associated metadata written to each write journal slot is related to the blocks stored in the adjacent SSDCopy slot as described in Table 4. This arrangement does suggest a tradeoff, with an increase in the number of seeks required to update the write journal during non-degraded operation because multiple write streams must be maintained. However when a SSD fails and the write journal (235, 240) needs to be reconciled with the fast-drive image copy area 245, the average distance of the spinning magnetic drive seeks is greatly reduced due to the proximity of the data areas. Hence, system performance is improved during periods of SSD drive failure.

Figure 3:
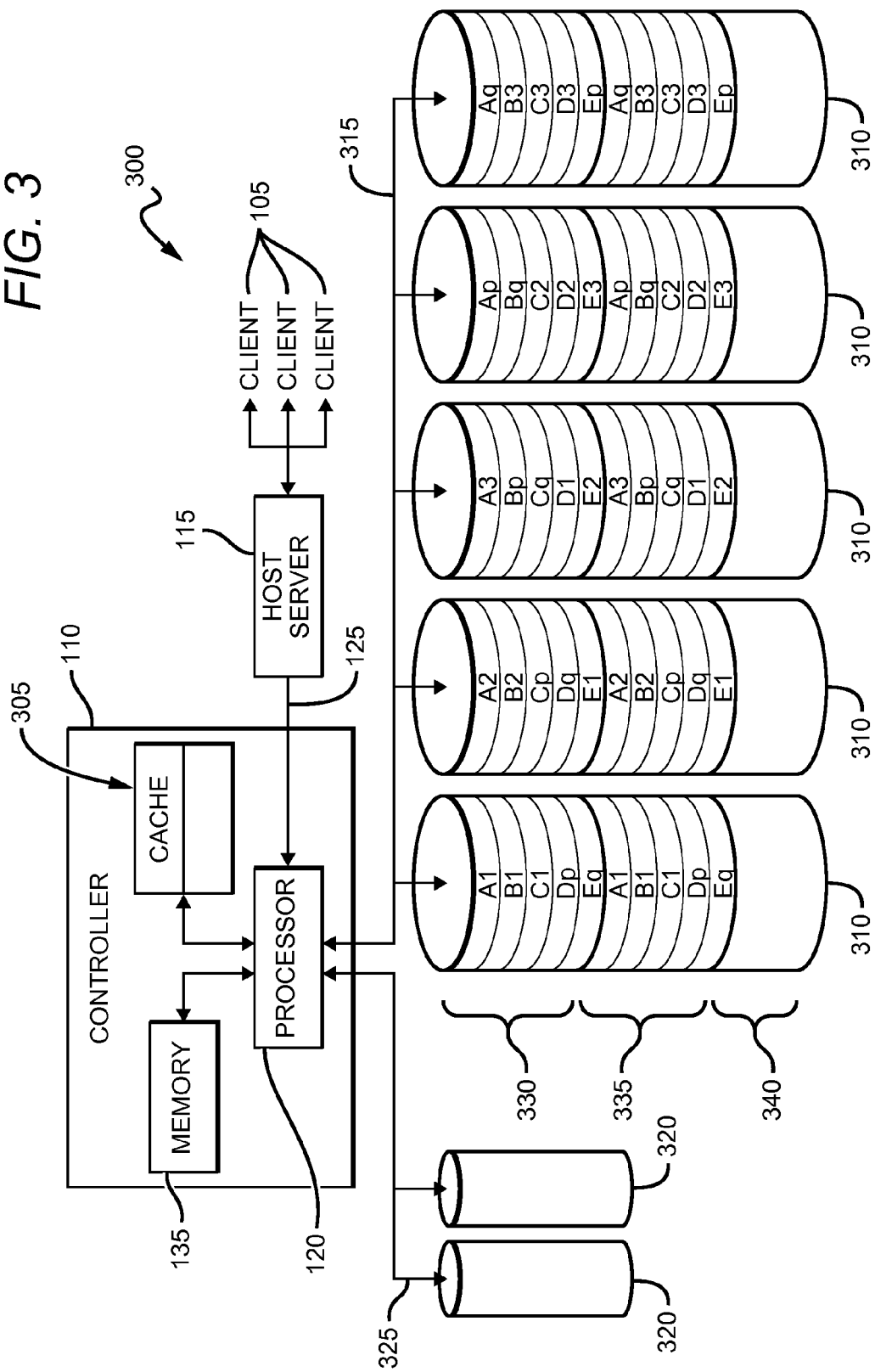
FIG. 3 is a block diagram of another embodiment of a system having a slow drive pool protected with parity P+Q data in a RAID-6 configuration for data redundancy and a pair of fast drives for write performance.

FIG. 3 illustrates the controller and host server first illustrated in FIG. 1, each configured in a system for redundant data storage 300 that has the controller in communication with a slow drive pool protected with parity P+Q data in a RAID-6 configuration for data redundancy and a pair of fast drives for write performance. The clients 105 may be in communication with the processor 120 in the storage controller 110 through the host server 115 that is in communication with the storage controller 110 through the controller bus 125. The processor 120 may be in communication with a write cache 305 that stores host write data and associated metadata, and may be in communication with a processor memory 135 that stores processor instructions. The processor 120 is in communication with a plurality of slow drives 310 through a bus 315 that may be an FC, SAS, iSCSI, or PCIe bus or any other bus that is appropriate to communicate between the processor 120 and slow drives 310. The slow drives 310 may be spinning magnetic drives such as SAS or SATA drives, may be SSD drives, or may consist of both SAS/SATA drives and SSD drives. The processor 120 may also in communication with a plurality of fast drives 320 through a bus 325. The fast drives may be a pair of SSD drives that have a faster IOPS than the slow drives 310. The slow drives 310 may each have at least two write journals (330, 335) partitioned from a fast-drive image copy portion 340. The write journals (330, 335) and fast-drive copy portions 340 provide a RAID-6-protected WDS and image copy for the fast drives 320. The write cache 305 may have a plurality of write-data buffers and a journal metadata spaces (not shown) for receipt of host write data and associated metadata and may be sized appropriately to provide a complete stripe across the slow drives 310, including P+Q data calculated by the processor 120.

As in the embodiments illustrated in FIGS. 1 and 2, a DJB may be maintained in a bitmap in the cache 305 to record the write-data buffer blocks (not shown) that have been written onto an SSD drive 320 and into the a write journal (330, 335), but that have not yet been a part of a background copy of the SSD drives 320 into the fast-drive copy portions 340 of the slow drives 310.

Figure 4:
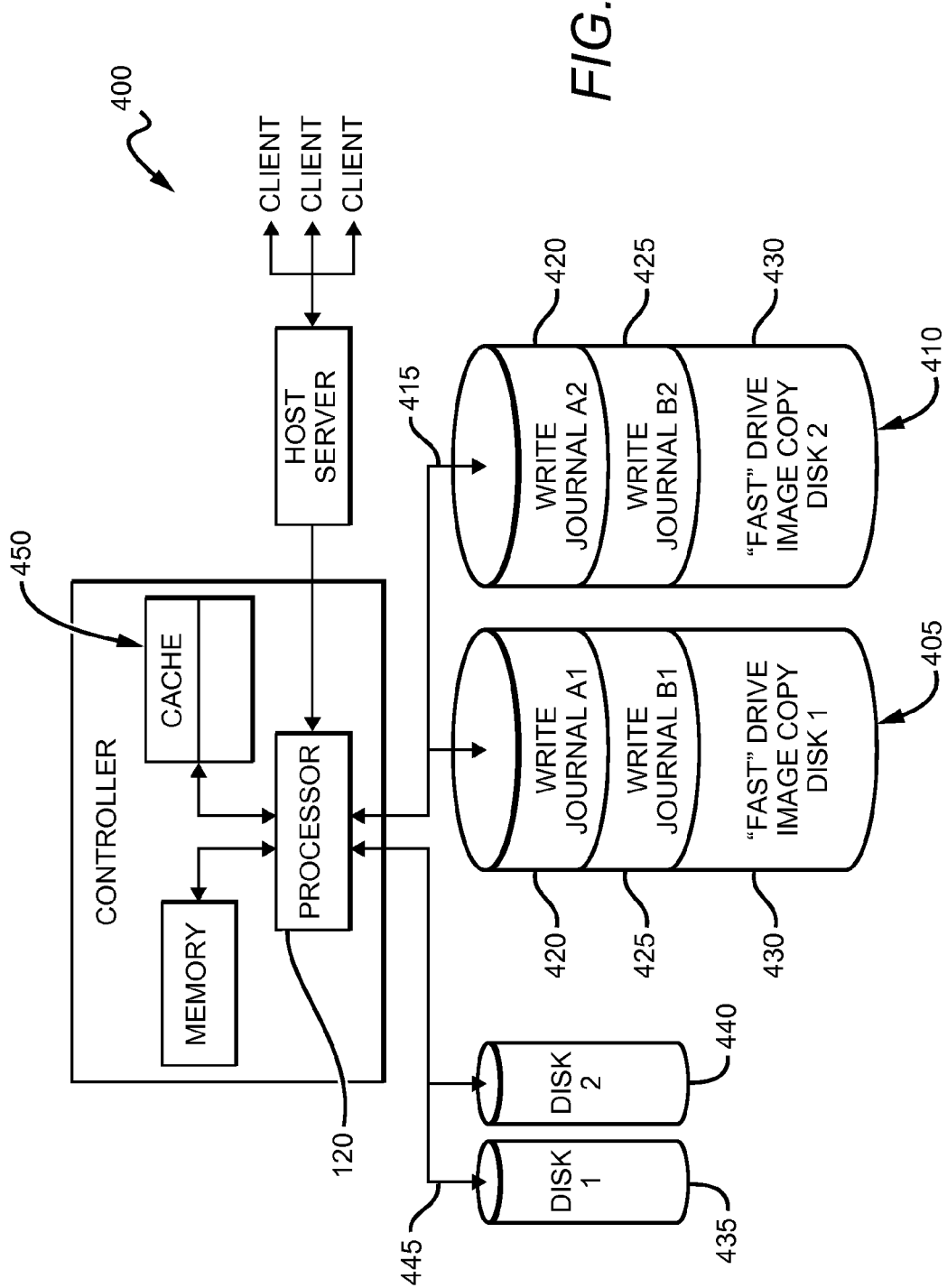
FIG. 4 is a block diagram of another embodiment of a system having a slow drive pool configured in a RAID-1 configuration for data redundancy and a pair of fast drives for write performance.

FIG. 4 illustrates the controller and host server first illustrated in FIG. 1, each configured in a system for redundant data storage 400 that has the controller in communication with a slow drive pool configured in a RAID-1 configuration for data redundancy and a pair of fast drives for write performance. The processor 120 may be in communication with the set of slow drives, such as spinning magnetic drives (405, 410), through a bus 415 that may be an FC, SAS, iSCSI, or PCIe bus or any other bus that is appropriate to communicate between the processor 120 and spinning magnetic drives (405, 410). The spinning magnetic drives 405 may each have at least one write journal (420 or 425) partitioned from a fast-drive image copy area 430. The fast-drive copy portions 430 provide a RAID-1-protected image copy of a pair of SSD drives (435, 440) that may be in communication with the processor 120 through a bus 445. The bus 445 may also be an FC, SAS, iSCSI, or PCIe bus or any other bus that is appropriate to communicate between the processor 120 and fast-drive image copy area 430. With at least one write journal buffer 450 in communication with the slow drives (405, 410) through bus 415 and sized appropriately to provide a complete stripe across the slow drives (405, 410), each at least one write journal buffer 450 is written sequentially to the spinning magnetic drives (405, 410) with a full stripe write.

In an alternative embodiment, each of the SSD drives (435, 440) is copied into respective fast-drive copy portions 430 in a striped (i.e. contiguous) manner, rather than imaged, to accomplish the RAID-1 redundancy. A contiguous arrangement of the SSD host data blocks has advantages when the capacity of the SSD portion of system is expanded by adding new SSD drives, because it removes the requirement to reorder the host data on the SSD drives to support an increased stripe size which would be required for traditional striped RAID-0 arrangement on the SSD.

The use of data protection for the WDS in the form of parity P (illustrated in FIG. 2) or P+Q (illustrated in FIG. 3) allows for greater data redundancy within respective systems. Host write data is not lost until the SSD and spinning magnetic drives are degraded to the point that the data cannot be reconstructed from the remaining spinning magnetic drives and is not present on the SSD drives. Data loss for a parity protected WDS would require the failure of at least two spinning magnetic drives and one SSD. If the WDS is protected by P+Q data, then data loss would not occur until three spinning magnetic drives had failed and one SSD had failed. In all implementations many SSD drives can fail as long as the data integrity of the WDS can be maintained.

Figure 5:
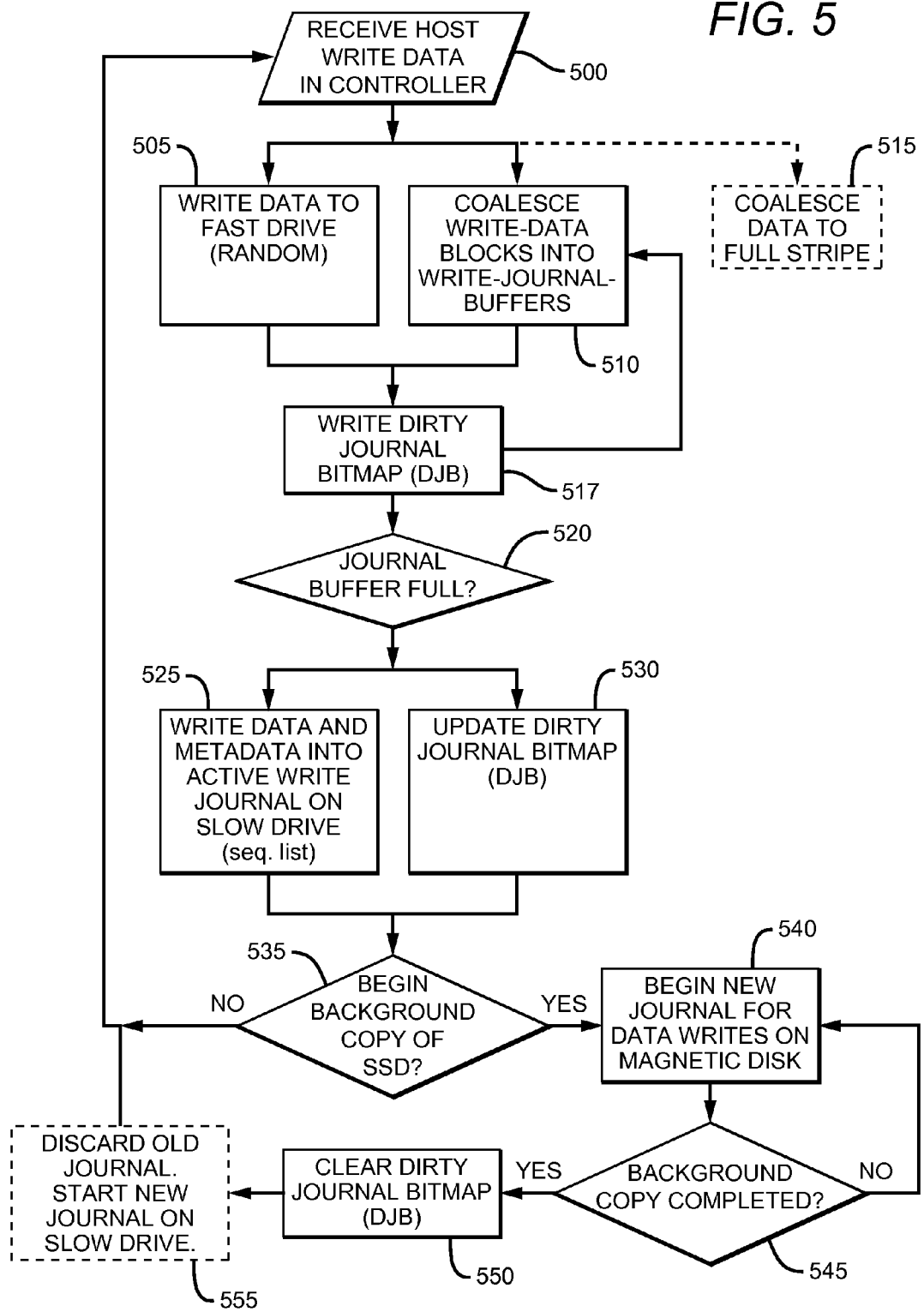
FIG. 5 is a flow diagram of one embodiment that describes host write data buffered in a journal buffer, written to an SSD and journaled on a spinning magnetic drive.

FIG. 5 illustrates one embodiment of a method for providing redundant data storage (e.g. "writing") using a higher-IOP-speed or "fast" drive for performance and a slower-IOP-speed or "slow" drive for data redundancy. Host write data may be received in the controller (block 500). The host write data may be written to a fast drive (block 505) such as an SSD drive, and may be coalesced into write-data blocks of a write journal buffer in the controller along with associated metadata (block 510). In one embodiment, the host write data may be coalesced into what would be a full write stripe for the slow drive (block 515) and an entry in the dirty journal bitmap is made (block 517) to track the fast drive write and write journal buffer write. If the write journal buffer is full (test 520) indicating a full stripe write is ready, the host write data and associated metadata in the write-data blocks are written to an active write journal of the slow drive (block 525) such as an SAS or SATA drive. A dirty bitmap journal may also be updated (block 530) to track the write to the active write journal. As part of a background activity, or sequentially as illustrated in FIG. 5, a copy of the fast drive may begin (test 535) and journaling of host write data begins in a new write journal on the slow drive (block 540). If the background copy of the fast drive is complete (test 545), then the dirty journal bitmap may be cleared (block 550), the old write journal discarded (block 555) and the controller continues to receive host write data in preparation for further writes to a new write journal on the slow drive (block 500). In alternative embodiments, the slow drive may be a set of slow drives, such as a RAID-configured array of SAS or SATA drives. The fast drive may be a set of fast drives, such as SSD drives, with the random IOPS speed of each of the fast drives faster than the random IOPS speed of the set of SAS or SATA drives. Or, the set of slow drives may be a set of SSD drives that have random IOPS speeds that are slower than the random IOPS speeds of the set of SSD drives that are the fast drives.

While various implementations of the application have been described, it will be apparent to those of ordinary skill in the art that many more embodiments and implementations are possible that are within the scope of this invention.

What is claimed is:

1. A method of providing data storage, comprising:
    writing a first plurality of data non-sequentially to at least one solid-state drive;
    coalescing said first plurality of data and an associated plurality of journal metadata in a write journal buffer of a controller; and
    writing said first plurality of data and an associated first plurality of journal metadata in a first write journal of a plurality of spinning magnetic drives using a full stripe write.

2. The method of claim 1, further comprising:
    writing a background copy of said at least one solid-state drive across at least one of said plurality of spinning magnetic drives.

3. The method of claim 2, further comprising:
    writing a second plurality of data and an associated second plurality of journal metadata in a second write journal of said plurality of spinning magnetic drives after said writing said background copy is complete.

* * * * *